April 6, 1954                F. J. COCHNAR                 2,674,411
                      LAND MEASURING ODOMETER MOUNTING
                            Filed Dec. 12, 1951

INVENTOR.
Frank J. Cochnar
BY Arthur H. Sturges
ATTORNEY

UNITED STATES PATENT OFFICE 2,674,411

LAND MEASURING ODOMETER MOUNTING

Frank J. Cochnar, Dorchester, Nebr.

Application December 12, 1951, Serial No. 261,224

1 Claim. (Cl. 235—95)

This invention relates to gravity actuated counting devices for use on wheels of vehicles and particularly farm implements for measuring land over which the vehicles travel, and in particular a conventional counting device having a weight suspended at one end and attaching elements for mounting the counter on a vehicle wheel, whereby as the wheel travels through one-half of a revolution the weight is set and during the second half of the revolution the counting mechanism operates.

The purpose of this invention is to provide a counting or land measuring device that may readily be attached to a wheel of a farm implement which operates automatically to count the revolutions of the wheel as the wheel travels over land.

It is customary for farmers to hire equipment for accomplishing farm work and the compensation therefor is calculated from the number of miles traveled. Various types of measuring and counting instruments have been used on different machines, however, it is difficult to attach the general type of measuring instrument to a wheel so that the device operates automatically as the wheel turns.

With this thought in mind this invention contemplates a comparatively small housing in which a conventional counter may be installed, a weight suspended from the counter, means for locking the housing, and means for attaching the housing to a vehicle wheel.

Where men are hired to perform farm work with equipment owned by themselves there is a temptation to set the counting device ahead, and for this reason the lock is provided so that the housing can only be opened by the farmer.

The object of this invention is, therefore, to provide a counting of measuring device wherein a counter is enclosed in a sealed housing and the housing is readily attached to a wheel of a farm implement.

Another object of the invention is to provide a counter for farm implements wherein the device may readily be reset.

Another object of the invention is to provide a device for measuring the distance traveled by a vehicle in which the device includes a conventional counter.

A further object of the invention is to provide a counter for measuring the distance traveled by a farm implement which is of a simple and economical construction.

With these and other objects and advantages in view the invention embodies a box-like housing having a clip angle extended from one side, clamping blocks for retaining a counter in the housing, a weight adapted to be clamped to a shaft of a counter, a cover for the housing, and a lock for securing the housing in the closed position.

Other features and advantages of the invention will appear from the following description taken in connection with the drawings, wherein.

Figure 1:
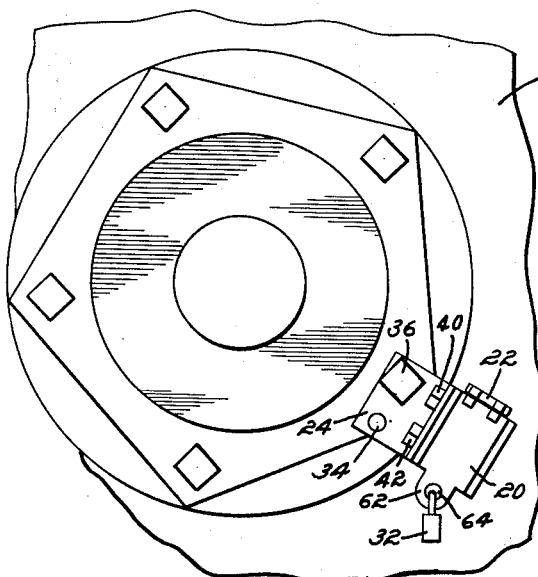
Figure 1 is a front elevational view of the counting device, showing the device attached to the hub of a vehicle wheel.

Referring now to the drawings wherein like reference characters denote corresponding parts the improved land measuring device or counter of this invention includes a housing having a base 10 with side walls 12 and 14, and end walls 16 and 18, a cover 20, which is secured to the end wall 16 with a hinge 22, a clip angle having legs 24 and 26, a conventional counter 28, a weight 30, and a lock 32.

Figure 2:
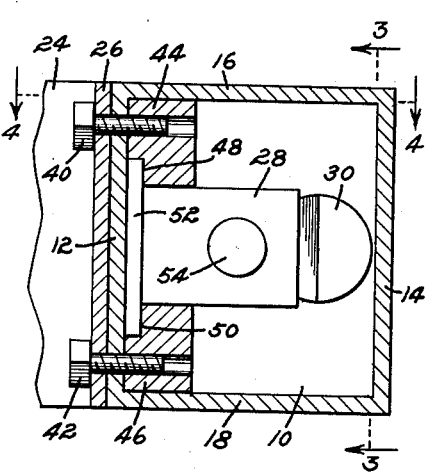
Figure 2 is a view similar to that shown in Figure 1 with the parts shown on an enlarged scale and also with the parts shown in section, the section being taken through the outer part of the housing.
Figure 3:
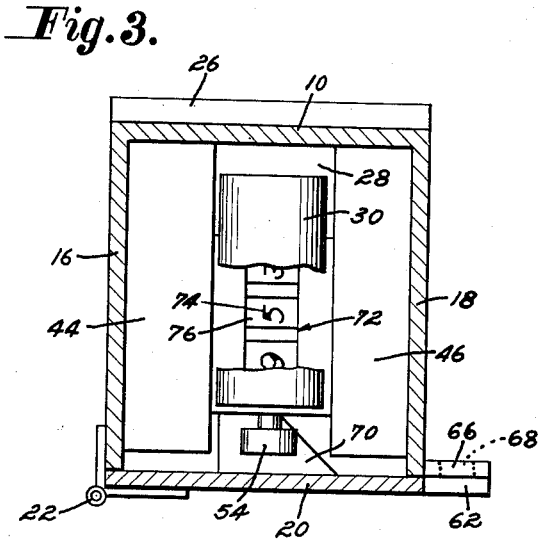
Figure 3 is a cross section through the housing being taken on line 3—3 of Figure 2.

The legs of the clip angle are provided with bolt holes 34 whereby the clip angle may be bolted to the wheel of a vehicle, and as illustrated in Figure 1, a bolt 36 of the hub of a wheel 38 extends through one of the bolt holes 34 and, thereby, secures the clip angle and counting device to the wheel. The opposite leg of the clip angle is secured to the housing with bolts 40 and 42 which extend through openings in the clip angle and housing and are threaded into blocks 44 and 46, respectively, in the housing, as shown in Figure 2.

The blocks 44 and 46 are provided with recesses 48 and 50, respectively, into which the edges of a flange or base 52 of the counter 28 extend, thereby providing means for clamping the counter in the housing. One end of the counter is provided with a knob 54 for resetting the counter, and the weight 30 is secured to a shaft 56 extended from the opposite end of the counter by a clamp 58 having a bolt 60 therein and having an arm to which the weight is secured. By this means the position of the weight is adjustable so that the device will operate successfully in substantially any position.

The end of the cover opposite to that on which the hinge is positioned is provided with a tab 62 having an opening 64 therein, and a similar tab 66 having a slot 68 therein extends from the end wall 18. The bail of the lock 32 extends through the opening and slot of the tabs, as shown in Figure 1.

The cover or door is provided with a lug 70 which forms a stop for retaining the counter in operative position in the housing when the cover is closed. The counter is provided with a window 72 and numerals 74 on discs 76 display the number of feet or miles traveled by the implement, however, where a simple counting device is used the numerals may show the number of revolutions of the wheel on which the device is mounted, and the distance computed from the circumference of the wheel.

Figure 4:
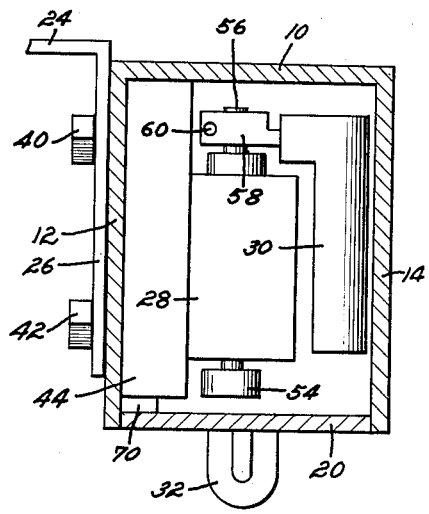
Figure 4 is also a cross section through the housing being taken on line 4—4 of Figure 2.

With the wheel in the position shown in Figure 1, the weight will move downwardly transmitting a rotary motion to the shaft 56 whereby the counter will be clocked, and with the wheel turned so that the device is substantially diametrically opposite to the position shown in Figure 1 the weight will move in an opposite direction, causing the count of one to be indicated on the counting device. The odometer housing is attached to the face of a wheel with the clip 24, whereby it may be attached as desired, and after the machine or implement is used the housing may be removed and bolted on another machine or implement, or stored until use thereof is again desired. With the parts as shown in Figures 2 and 4, the shaft 56 extends outwardly perpendicular to the face of the wheel whereby the shaft is in a horizontal position, and with the weight 30 carried by an arm extended from the shaft the weight will travel downwardly as the housing moves upwardly whereby the shaft will be rotated in one direction as the housing travels upwardly on one side of the wheel and in the opposite direction as the housing travels downwardly on the opposite side of the wheel. By this means the counter will make one count for each revolution of the wheel, and with the circumference of the wheel known, the distance the wheel travels may readily be computed.

From the foregoing description it is thought to be obvious that a device for measuring land constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

In an odometer mounting, the combination which comprises a rectangular-shaped box-like housing having a base with side and end walls, the portion of the housing opposite to the base being open, a cover hinged to the open portion of the housing, means temporarily securing the cover in the position of closing the housing, a clip angle having angularly disposed legs with bolt holes therethrough positioned against one of the side walls of the housing, spaced parallel blocks having recesses in inner opposed surfaces positioned against the inner surface of the side wall of the housing against the outer surface of which said clip angle is positioned, bolts extended through the leg of the clip angle positioned against the side wall of the housing, through said side wall, and threaded in said blocks for mounting the clip angle on the housing and also for clamping an odometer between the blocks in the housing, and a weight adapted to be mounted on a shaft of an odometer positioned in the housing and clamped between the blocks, said weight positioned whereby with the clip angle of the housing secured under a bolt of a hub of a wheel the weight rotates the odometer with each revolution of the wheel.

References Cited in the file of this patent

UNITED STATES PATENTS

| Number | Name | Date |
|---|---|---|
| 183,898 | Brokaw | Oct. 31, 1876 |
| 396,210 | Johnson | Jan. 15, 1889 |
| 599,320 | Dorchester | Feb. 22, 1898 |
| 628,340 | Leuchter | July 4, 1899 |
| 718,104 | Dixon | Jan. 13, 1903 |
| 887,279 | Smith | May 12, 1908 |
| 1,052,686 | Neilson | Feb. 11, 1913 |
| 1,196,495 | Veeder | Aug. 29, 1916 |
| 1,361,008 | Browne | Dec. 7, 1920 |
| 1,461,956 | Wood | July 17, 1923 |
| 2,531,448 | Lingenfelder | Nov. 28, 1950 |